United States Patent
Kawashima (10) Patent No.: US 8,472,844 B2
(45) Date of Patent: Jun. 25, 2013

(54) DRIVE MECHANISM AND IMAGE FORMING APPARATUS PROVIDED WITH THE SAME

(75) Inventor: Tetsuro Kawashima, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 305 days.

(21) Appl. No.: 13/039,746

(22) Filed: Mar. 3, 2011

(65) Prior Publication Data

US 2011/0243611 A1 Oct. 6, 2011

(30) Foreign Application Priority Data

Mar. 31, 2010 (JP) ................................ 2010-083905

(51) Int. Cl.
G03G 15/00 (2006.01)

(52) U.S. Cl.
USPC ........................................................ 399/167

(58) Field of Classification Search
USPC ........................................................ 399/167
See application file for complete search history.

(56) References Cited

U.S. PATENT DOCUMENTS

| | | | | |
|---|---|---|---|---|
| 4,967,239 A * | 10/1990 | Sakakura | ........................ | 399/75 |
| 5,631,726 A * | 5/1997 | Sawada | ........................ | 399/111 |
| 5,634,178 A * | 5/1997 | Sugiura et al. | ................ | 399/110 |
| 5,708,933 A * | 1/1998 | Nogami et al. | ................ | 399/167 |
| 5,761,580 A * | 6/1998 | Harada et al. | ................ | 399/167 |
| 5,950,052 A * | 9/1999 | Nomura et al. | ................ | 399/167 |
| 6,029,032 A * | 2/2000 | Watanabe et al. | ............. | 399/111 |
| 7,245,858 B2 * | 7/2007 | Okada et al. | .................. | 399/167 |
| 7,348,701 B2 * | 3/2008 | Baek | .............................. | 310/91 |
| 2005/0084294 A1 * | 4/2005 | Mizushima et al. | .......... | 399/167 |
| 2005/0111882 A1 * | 5/2005 | Sudo et al. | ..................... | 399/222 |
| 2005/0214023 A1 * | 9/2005 | Foster et al. | ................... | 399/110 |
| 2005/0276634 A1 * | 12/2005 | Jeon | .............................. | 399/167 |
| 2005/0286931 A1 * | 12/2005 | Kim et al. | ..................... | 399/167 |
| 2005/0286932 A1 * | 12/2005 | Kim et al. | ..................... | 399/167 |
| 2005/0286933 A1 * | 12/2005 | Kim et al. | ..................... | 399/167 |
| 2006/0171739 A1 * | 8/2006 | Nakaya | ......................... | 399/119 |
| 2007/0147895 A1 * | 6/2007 | Hayakawa | .................... | 399/167 |
| 2007/0189804 A1 * | 8/2007 | Yasumitsu | .................... | 399/111 |
| 2007/0237549 A1 * | 10/2007 | Okabe | ........................... | 399/222 |
| 2008/0261768 A1 * | 10/2008 | Miyawaki et al. | ............. | 475/284 |
| 2009/0169244 A1 * | 7/2009 | Carter et al. | ................. | 399/110 |
| 2009/0169255 A1 * | 7/2009 | Sato | ............................... | 399/119 |
| 2010/0077880 A1 * | 4/2010 | Mizuno | ........................... | 74/409 |
| 2011/0052261 A1 * | 3/2011 | Fukushima et al. | .......... | 399/167 |
| 2011/0058861 A1 * | 3/2011 | Suzuki | ........................... | 399/328 |

FOREIGN PATENT DOCUMENTS

JP  H05-127442  5/1993

* cited by examiner

*Primary Examiner* — Walter L Lindsay, Jr.
*Assistant Examiner* — David Bolduc
(74) *Attorney, Agent, or Firm* — Dilworth & Barrese, LLP.

(57) ABSTRACT

A drive mechanism of the present invention includes: a housing part composed of a first resin cover and a second resin cover; a first sheet metal member housed in the housing part; a first rotation transmission wheel group disposed on the first sheet metal member on a side directed to the first resin cover; a second rotation transmission wheel group disposed on the first sheet metal member on a side directed to the second resin cover; a positioning part rotatably supporting a first rotation transmission wheel of the first rotation transmission wheel group; and a pin member positioned by inserting into the positioning part via the first resin cover.

6 Claims, 7 Drawing Sheets

DRIVE MECHANISM AND IMAGE FORMING APPARATUS PROVIDED WITH THE SAME

This application is based on and claims the benefit of priority from Japanese Patent Application No. 2010-083905, filed on 31 Mar. 2010, the content of which is incorporated herein by reference.

BACKGROUND OF THE INVENTION

1. Field of the Invention

The present invention relates to a drive mechanism and an image forming apparatus provided with the same.

2. Related Art

An image forming apparatus such as a copy machine, a printer, a facsimile machine and the like generally includes: a plurality of image supporting units (photoreceptor drums); a developing unit that transforms an electrostatic latent image formed on an image supporting unit to a toner image; an image transfer part that transfers the toner image formed on the image supporting unit to an object such as paper; and a fixing part that fixes the toner image transferred to the object.

There is a demand for an image forming apparatus of higher image quality and lower price. Accordingly, a structure for maintaining high dimensional accuracy is required in a drive mechanism to fulfill such a demand.

As a drive mechanism of high dimensional accuracy, for example, a drive mechanism has been proposed that includes: a sheet metal part; a shaft rotatably supported by the sheet metal part; a drum part rotatably supported by the shaft; and a driving part firmly attached to sheet metal, in which a drive gear attached to an output shaft of the driving part is engaged with a driven gear attached to the drum part. With such a drive mechanism, since the driving part and the shaft are attached to the sheet metal part, an interaxial distance between the drive gear and the driven gear is highly accurate.

SUMMARY OF THE INVENTION

In the abovementioned drive mechanism, in a case where the driving part and the shaft are covered only with the sheet metal part, grease injected to the driving gear and the driven gear may scatter and adhere to other units and components. In addition, in a case where the driving part and the shaft are covered only with a resin member, the interaxial distance between the driving gear and the driven gear may change or axial inclination may arise in the driving gear and the driven gear.

The present invention relates to a drive mechanism that includes a first resin cover, a second resin cover, a housing part, a first sheet metal member, a first rotation transmission wheel group, a second rotation transmission wheel group, a second sheet metal member, at least one positioning part and at least one pin member. The first resin cover has a first concave part opening toward a first face. The second resin cover has a second concave pare opening toward the first resin cover, and is disposed such that a periphery of the second concave part is aligned to come into contact with a periphery of the first concave part. The housing part includes the first concave part and the second concave part. The first sheet metal member is disposed inside the housing part. The first rotation transmission wheel group has at least one first rotation transmission wheel, and is housed by the housing part and disposed on the first sheet metal member on a side directed to the first resin cover. The second rotation transmission wheel group is housed by the housing part and disposed on the first sheet metal member on a side directed to the second resin cover. The second sheet metal member is disposed on the first resin cover on a side opposite to the second resin cover and disposed opposite to the first sheet metal member interposing the first resin cover therebetween. At least one positioning part is formed like a through hole in the first sheet metal member and rotatably supports the at least one first rotation transmission wheel. At least one pin member is installed upright on the second sheet metal member on a side directed to the first sheet metal member and each pin member is inserted into each positioning part via the first resin cover such that each pin member is positioned.

According to the present invention, since the pin member is inserted into the positioning part formed on the first sheet metal member, the accuracy of the interaxial distance between adjacent first pin members is maintained. As a result, it is possible to reduce an occurrence of noise due to the engagement of teeth upon rotation of the first rotation transmission wheel and the second rotation transmission wheel.

DETAILED DESCRIPTION OF THE INVENTION

Figure 1:
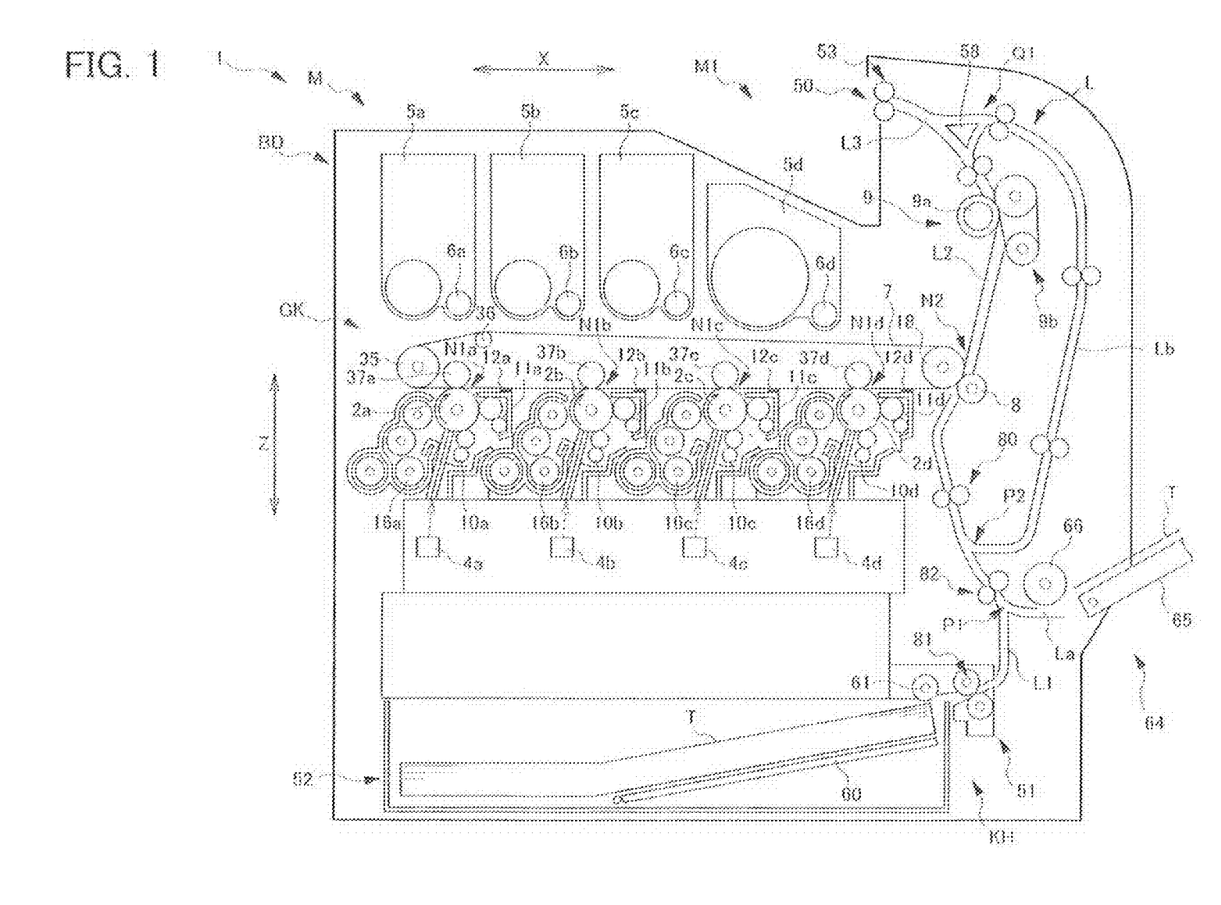
FIG. 1 is a front view illustrating an arrangement of components of a printer 1 according to a first embodiment of the present invention.

Embodiments of the image forming apparatus according to the present invention will be described hereinafter with reference to the drawings. An overall structure of the printer 1 as an image forming apparatus according to a first embodiment is described referring to FIG. 1. FIG. 1 is a front view illustrating an arrangement of components of the printer 1 as the first embodiment of the present invention.

Hereinafter, when viewed by a user standing in front of the printer 1, a horizontal direction is a direction X, an anteroposterior direction (depth direction) is a direction Y, and a vertical direction is a direction Z.

As shown in FIG. 1, the printer 1 as the image forming apparatus includes: an apparatus main body M; an image forming unit GK that forms a toner image on a sheet of paper T as a sheet-shaped object based on predetermined image information, and a paper feeding/ejection unit KH that feeds the sheet of paper T to the image forming unit GK and ejects the sheet of paper T on which the toner image is formed. The external shape of the apparatus main body M is composed of a cabinet BD as a housing.

As shown in FIG. 1, the image forming unit GK includes: photoreceptor drums 2a, 2b, 2c, and 2d as image supporting units (photoreceptors); charging parts 10a, 10b, 10c, and 10d; laser scanner units 4a, 4b, 4c, and 4d as exposure units; developing units 16a, 16b, 16c, and 16d; toner cartridges 5a, 5b, 5c, and 5d; toner feeding parts 6a, 6b, 6c, and 6d; drum cleaning parts 11a, 11b, 11c, and 11d; static eliminator 12a, 12b, 12c, and 12d; an intermediate image transfer belt 7; primary image transfer rollers 37a, 37b, 37c, and 37d; a secondary image transfer roller 8; an opposing roller 18; and the fixing part 9.

As shown in FIG. 1, the paper feeding/ejection unit KH includes a paper feeding cassette 52, a manual feeding unit 64, a paper feed path L for a sheet of paper T, a pair of resist rollers 80, a plurality of rollers or roller pairs, and an discharging part 50. It should be noted that, as will be described later, the paper feed path L is an assembly of a first paper feed path L1, a second paper feed path L2, a third paper feed path L3, a manual paper feed path La, and a reverse paper feed path Lb.

Components of the image forming unit GK and the paper feeding/ejection unit KH will be described in detail hereinafter.

First, a description is provided for the image forming unit GK. In the image forming unit GK, as the photoreceptor drums 2a, 2b, 2c and 2d rotate during image formation, the following steps are performed in the following order on a surface of the photoreceptor drums 2a, 2b, 2c, and 2d; charging by the charging parts 10a, 10b, 10c, and 10d; exposure by the laser scanner units 4a, 4b, 4c, and 4d; development by the developing units 16a, 16b, 16c, and 16d; primary image transfer by the intermediate image transfer belt 7 and the primary image transfer rollers 37a, 37b, 37c, and 37d; static elimination by the static eliminators 12a, 12b, 12c, and 12d; and cleaning by the drum cleaning parts 11a, 11b, 11c, and 11d.

In addition, secondary image transfer by the intermediate image transfer belt 7, the secondary image transfer roller 8 and the opposing roller 18, and fixation by the fixing part 9 are performed in the image forming unit GK.

Each of the photoreceptor drums 2a, 2b, 2c, and 2d is composed of a cylindrically shaped member and functions as a photoreceptor or an image supporting unit. Each of the photoreceptor drums 2a, 2b, 2c, and 2d is disposed rotatable in a direction of an arrow shown in FIG. 1, about a rotational axis that extends in a direction orthogonal to a direction of movement of the intermediate image transfer belt 7. An electrostatic latent image is formed on a surface of each of the photoreceptor drums 2a, 2b, 2c, and 2d.

Each of the charging parts 10a, 10b, 10c, and 10d is disposed to face the surface of each of the photoreceptor drums 2a, 2b, 2c, and 2d. Each of the charging parts 10a, 10b, 10c, and 10d uniformly positively charge (straight polarity) the surface of each of the photoreceptor drums 2a, 2b, 2c, and 2d.

Each of the laser scanner units 4a, 4b, 4c, and 4d, which functions as an exposure unit, is disposed to be spaced apart from the surface of each of the respective photoreceptor drums 2a, 2b, 2c, and 2d. The laser scanner units 4a, 4b, 4c, and 4d are each configured to include a laser light source, a polygonal mirror, a polygonal mirror driving motor and the like, which are not illustrated.

Each of the laser scanner units 4a, 4b, 4c, and 4d scans and exposes the surface of each of the photoreceptor drums 2a, 2b, 2c, and 2d, based on image information input from an external apparatus such as a PC (personal computer). An electric charge of an exposed part of the surface of each of the photoreceptor drums 2a, 2b, 2c, and 2d is removed, which are scanned and exposed by the laser scanner units 4a, 4b, 4c, and 4d, respectively. In this way, an electrostatic latent image is formed on the surface of each of the photoreceptor drums 2a, 2b, 2c, and 2d.

The developing units 16a, 16b, 16c, and 16d are disposed to correspond to the photoreceptor drums 2a, 2b, 2c, and 2d, respectively, facing corresponding surfaces of the photoreceptor drums 2a, 2b, 2c, and 2d. Each of the developing units 16a, 16b, 16c, and 16d forms a toner image of each color on the surface of each of the photoreceptor drums 2a, 2b, 2c, and 2d by depositing toner of each color on a part where an electric charge is removed in an electrostatic latent image formed on the surface of each of the photoreceptor drums 2a, 2b, 2c, and 2d. The developing units 16a, 16b, 16c, and 16d correspond to four colors of yellow, cyan, magenta, and black, respectively. Each of the developing units 16a, 16b, 16c, and 16d includes a developing roller disposed to face the surface of each of the photoreceptor drums 2a, 2b, 2c, and 2d, and stirring rollers for stirring toner, and the like.

The toner cartridges 5a, 5b, 5c, and 5d are provided correspond to the developing units 16a, 16b, 16c, and 16d, respectively, and store toners of different colors that are supplied to the developing units 16a, 16b, 16c, and 16d, respectively. The toner cartridges 5a, 5b, 5c, and 5d store toners of yellow, cyan, magenta, and black respectively.

The toner feeding parts 6a, 6b, 6c, and 6d are provided to correspond to the toner cartridges 5a, 5b, 5c, and 5d and the developing units 16a, 16b, 16c, and 16d, respectively. The toner feeding parts 6a, 6b, 6c, and 6d supply the toners of the respective colors stored in the toner cartridges 5a, 5b, 5c, and 5d to the developing units 16a, 16b, 16c, and 16d, respectively. The toner feeding devices 6a, 6b, 6c, and 6d are connected with the developing units 16a, 16b, 16c, and 16d, respectively, via toner delivery devices 500a, 500b, 500c and 500d.

The toner images of the colors formed on the photoreceptor drums 2a, 2b, 2c, and 2d are primarily transferred sequentially to the intermediate image transfer belt 7. The intermediate image transfer belt 7 goes around a driven roller 35, the opposing roller 18 operating of a driving roller, a tension roller 36 and the like. Since the tension roller 36 biases the intermediate image transfer belt 7 from inside to outside, a predetermined tension is applied to the intermediate image transfer belt 7.

The primary image transfer rollers 37a, 37b, 37c, and 37d are disposed opposite to the photoreceptor drums 2a, 2b, 2c, and 2d, respectively, interposing the intermediate image transfer belt 7 therebetween.

The intermediate image transfer belt 7 is sandwiched between the primary image transfer rollers 37a, 37b, 37c, and 37d and the photoreceptor drums 2a, 2b, 2c, and 2d. The sandwiched parts are pressed against surfaces of the photoreceptor drums 2a, 2b, 2c, and 2d. Primary image transfer nips N1a, N1b, N1c, and N1d are formed between the photoreceptor drums 2a, 2b, 2c, and 2d and the primary image transfer rollers 37a, 37b, 37c, and 37d, respectively. At the primary image transfer nips N1a, N1b, N1c, and N1d, toner images of the respective colors formed on the photoreceptor drums 2a, 2b, 2c, and 2d undergo primary transfer sequentially onto the intermediate image transfer belt 7. In this manner, a full-color toner image is formed on the intermediate image transfer belt 7.

A primary image transfer bias is applied to each of the primary image transfer rollers 37a, 37b, 37c, and 37d by a primary image transfer bias application part (not illustrated). The primary image transfer bias transfers a toner image of each color formed on each of the photoreceptor drums 2a, 2b, 2c, and 2d onto the intermediate image transfer belt 7.

The static eliminators 12a, 12b, 12c, and 12d are disposed so as to face surfaces of the photoreceptor drums 2a, 2b, 2c, and 2d, respectively. The static eliminators 12a, 12b, 12c, and 12d each remove electricity (eliminate an electrical charge) from a surface of each of the photoreceptor drums 2a, 2b, 2c, and 2*d* after the primary image transfer, by casting light on the surface of each of the photoreceptor drums 2*a*, 2*b*, 2*c*, and 2*d*.

The drum cleaning parts 11*a*, 11*b*, 11*c*, and 11*d* are disposed to face the surfaces of the photoreceptor drums 2*a*, 2*b*, 2*c*, and 2*d*, respectively. The drum cleaning parts 11*a*, 11*b*, 11*c*, and 11*d* remove toner and attached matter remaining on the surfaces of the photoreceptor drums 2*a*, 2*b*, 2*c*, and 2*d* after the primary image transfer, respectively, and transfer the removed toner to a collection mechanism such that the toner is collected.

The secondary image transfer roller 8 causes the full-color toner image, which has been primarily transferred to the intermediate image transfer belt 7, to be secondarily transferred to a sheet of paper T. A secondary image transfer bias is applied to the secondary image transfer roller 8 by a secondary image transfer bias application part (not illustrated). The secondary image transfer bias is a bias for transferring the full-color toner image formed on the intermediate image transfer belt 7 to the sheet of paper T.

The secondary image transfer roller 8 comes into contact with and departs away from the intermediate image transfer belt 7 selectively. More specifically, the secondary image transfer roller 8 is configured to be movable between a contact position at which it is in contact with the intermediate image transfer belt 7 and a spaced position at which it is spaced apart from the intermediate image transfer belt 7. In particular, the secondary image transfer roller 8 is disposed at the contact position when it transfers the toner image primarily transferred to the surface of the intermediate image transfer belt 7 to the sheet of paper T. Under other circumstances it is disposed at the spaced position.

The opposing roller 18 is disposed opposite to the secondary image transfer roller 8 interposing the intermediate image transfer belt 7 therebetween. The intermediate image transfer belt 7 is sandwiched between the secondary image transfer roller 8 and the opposing roller 18. The sheet of paper T is pressed against an outer surface (a surface to which the toner image is primarily transferred) of the intermediate image transfer belt 7. A secondary image transfer nip N2 is formed between the intermediate image transfer belt 7 and the secondary image transfer roller 8. At the secondary image transfer nip N2, the full-color toner image primarily transferred to the intermediate image transfer belt 7 is secondarily transferred to the sheet of paper T.

The fixing part 9 fuses and pressurizes respective color toners forming the toner image that has been secondarily transferred to the sheet of paper T, such that the color toners are fixed on the sheet of paper T. The fixing part 9 includes a heating rotator 9*a* that is heated by a heater, and a pressurizing rotator 9*b* that is brought into pressure contact with the heating rotator 9*a*. The heating rotator 9*a* and the pressurizing rotator 9*b* sandwich and apply pressure to the sheet of paper T to which the toner image is secondarily transferred, and also feed the sheet of paper T. The sheet of paper T is fed while sandwiched between the heating rotator 9*a* and the pressurizing rotator 9*b*, so that the toner transferred to the sheet of paper T is fused and pressurized to be fixed to the sheet of paper T.

Next, the paper feeding/ejection unit KH is described. As shown in FIG. 1, the paper feeding cassette 52 for housing sheets of paper T is disposed in a lower part of the apparatus main body M. The paper feeding cassette 52 is configured to be manually drawn in a horizontal direction from the cabinet BD of the apparatus main body M. The paper feeding cassette 52 includes a paper tray 60 on which the sheets of paper T are placed. The paper feeding cassette 52 stores the sheets of paper T stacked on the paper tray 60. A sheet of paper T placed on the paper tray 60 is fed to the paper feed path L by a cassette feeding part 51 disposed in an end part of the paper feeding cassette 52 on a side of feeding the paper (at a right end part of FIG. 1). The cassette feeding part 51 includes a double feed prevention mechanism including: a forward feed roller 61 for picking up a sheet of paper T on the paper tray 60; and a pair of paper feeding rollers 81 for feeding the sheet of paper T one at a time to the paper feed path L.

The manual feeding unit 64 is provided on a right lateral face (the right side in FIG. 1) of the apparatus main body M. The manual feeding unit 64 is provided primarily for the purpose of feeding other sheets of paper T that are different in size and type from the sheets of paper T stored in the paper feeding cassette 52 to the apparatus main body M. The manual feeding unit 64 includes the manual feeding tray 65, which composes a portion of a right lateral face of the apparatus main body M when the manual feeding unit 64 is closed, and a paper feeding roller 66. A lower end of the manual feeding tray 65 is rotatably attached in a vicinity of the paper feeding roller 66 (openable and closable). A sheet or sheets of paper T are placed on the manual feeding tray 65 while it is open. The paper feeding roller 66 feeds a sheet of paper T placed on the manual feeding tray 65 while it is open to the manual feeding path La.

The paper feed path L includes: the first paper feed path L1 from the cassette feeding part 51 to the secondary image transfer nip N2; the second paper feed path L2 from the secondary image transfer nip N2 to the fixing part 9; the third paper feed path L3 from the fixing part 9 to the discharging part 50; the manual paper feed path La that guides paper fed from the manual feeding unit 64 to the first paper feed path L1; and the reverse paper feed path Lb that reverses and returns the sheet of paper T that is fed from a downstream side to an upstream side in the third paper feed path L3 to the first paper feed path L1.

In addition, a first junction P1 and a second junction P2 are provided in the middle of the first paper feed path L1. A first branch part Q1 is provided in the middle of the third paper feed path L3. The first junction P1 is where the manual paper feed path La joins the first paper feed path L1. The second junction P2 is where the reverse paper feed path Lb joins the first paper feed path L1. The first branch part Q1 is where the reverse paper feed path Lb branches off from the third paper feed path L3.

A paper detection sensor (not illustrated) for detecting a sheet of paper T and a pair of resist rollers 80 are disposed in the middle of the first paper feed path L1 (more specifically, between the second junction P2 and the secondary image transfer nip N2). The paper detection sensor is disposed immediately before the pair of resist rollers 80 in a feed direction of the sheet of paper T (upstream of the feed direction). The pair of resist rollers 80 performs skew compensation of the sheet of paper T and timing adjustment with respect to formation of a toner image in the image forming unit GK. The pair of resist rollers 80 performs the abovementioned compensation and the timing adjustment based on signal information detected by the paper detection sensor and feeds the sheet of paper.

A pair of intermediate rollers 82 is disposed between the first junction P1 and the second junction P2 in the first paper feed path L1. The pair of intermediate rollers 82 is disposed on a downstream side in the paper feed direction with respect to the pair of paper feeding rollers 81. It sandwiches to feed a sheet of paper T, which is fed from the pair of paper feeding rollers 81 to the pair of resist rollers 80.

A reverse paper feed path Lb causes a surface (an unprinted surface) opposite to a surface having already been printed to face the intermediate image transfer belt 7, when duplex printing of a sheet of paper T is performed. The reverse paper feed path Lb reverses and returns the sheet of paper T, which is fed from the first branch part Q1 toward the discharging part 50, to the first paper feed path L1. Subsequently the reverse paper feed path Lb feeds the sheet of paper T to upstream of the pair of resist rollers 80, which is disposed upstream of the secondary image transfer roller 8. At the secondary image transfer nip N2, a toner image is transferred to the unprinted surface of the sheet of paper T that has been reversed by the reverse paper feed path Lb.

A regulating member 58 is provided in the first branch part Q1. The regulating member 58 regulates a feed direction of the sheet of paper T, which is discharged from the fixing part 9 and fed from upstream to downstream of the third paper feed path L3, in a direction toward the discharging part 50. The regulating member 58 regulates a feed direction of the sheet of paper T, which is fed from the discharging part 50 from downstream to upstream of the third paper feed path L3, to a direction toward the reverse paper feed path Lb.

A discharging part 50 is provided at an end part of the third paper feed path L3. The discharging part 50 is disposed in an upper part of the apparatus main body M. The discharging part 50 has an opening toward a left lateral face of the apparatus main body M (left side in FIG. 1). The discharging part 50 discharges the sheet of paper T outside the apparatus main body M. The discharging part 50 includes a pair of discharging rollers 53. The pair of discharging rollers 53 discharges the sheet of paper T, which is fed in the third paper feed path L3 from upstream to downstream, outside the apparatus main body M. The pair of discharging rollers 53 reverses the feed direction of the sheet of paper T at the discharging part 50 and feeds the sheet of paper T upstream of the third paper feed path L3.

A discharged paper collection part M1 is provided on a side of the opening of the discharging part 50. The discharged paper collection part M1 is provided on an upper face (outer face) of the apparatus main body M. The discharged paper collection part M1 is where the upper face of the apparatus main body M is recessed downward. A bottom face of the discharged paper collection part M1 composes a portion of the upper face of the apparatus main body M. Sheets of paper T, on which predetermined toner images are formed and which are discharged from the discharging part 50, are stacked and collected in the discharged paper collection part M1. It should be noted that a sensor (not illustrated) for detecting paper is disposed at a predetermined position of each paper feed path.

Next, operation of the printer 1 according to the first embodiment will be briefly described with reference to FIG. 1. First, single-side printing on a sheet of paper T housed in the paper feeding cassette 52 is described. The sheet of paper T contained in the paper feeding cassette 52 is fed to the first paper feed path L1 by the forward feed roller 61 and the pair of paper feeding rollers 81. The sheet of paper T is fed to the pair of resist rollers 80 by the pair of intermediate rollers 82 via the first junction P1 and the first paper feed path L1.

The pair of resist rollers 80 performs skew compensation of the paper T and timing adjustment with respect to a toner image in the image forming unit GK.

The sheet of paper T discharged from the pair of resist rollers 80 is introduced between the intermediate image transfer belt 7 and the secondary image transfer roller 8 (the secondary image transfer nip N2) via the first paper feed path L1. A toner image is transferred to the sheet of paper T between the intermediate image transfer belt 7 and the secondary image transfer roller 8.

Thereafter, the sheet of paper T is discharged from between the intermediate image transfer belt 7 and the secondary image transfer roller 8, and introduced into the fixing nip between the heating rotator 9a and the pressurizing rotator 9b in the fixing part 9. Toner is then fused in the fixing nip and fixed onto the sheet of paper T.

Subsequently, the sheet of paper T is fed to the discharging part 50 via the third paper feed path L3 and discharged from the discharging part 50 to the discharged paper collection part M1 by the pair of discharging rollers 53. Single-side printing on the sheet of paper T contained in the paper feeding cassette is thus completed.

In a case of single-side printing on a sheet of paper T placed on the manual feeding tray 65, the sheet of paper T is fed to the manual paper feed path La by the paper feeding roller 66, and then fed to the pair of resist rollers 80 via the first junction P1 and the first paper feed path L1. Subsequent operations are the same as single-side printing on a sheet of paper T contained in the paper feeding cassette 52, and descriptions thereof are omitted.

Next, operation of the printer 1 performing duplex printing will be described.

In a case of single-side printing, as described above, printing is completed by discharging a sheet of paper T printed on one side from the paper discharging part 50 to the discharged paper collection part M1.

On the other hand, in a case of duplex printing, a sheet of paper T, one side of which has been printed, is reversed and re-fed to the pair of resist rollers 80 via the reverse paper feed path Lb.

In more detail, the operation is the same as the abovementioned single-side printing until a step prior to discharging of the sheet of paper T, one side of which has been printed, from the paper discharging part 50 by the pair of discharging rollers 53. On the other hand, in a case of duplex printing, the pair of discharging rollers 53 stops rotating and resumes rotating in an opposite direction, while the sheet of paper T, one side of which has been printed, is held by the pair of discharging rollers 53. When the pair of discharging rollers 53 rotates in the opposite direction, the sheet of paper T held by the pair of discharging rollers 53 is fed in an opposite direction (a direction from the paper discharging part 50 to the first junction Q1).

As described above, when a sheet of paper T is fed in the opposite direction in the third paper feed path L3, the sheet of paper T is guided to the reverse paper feed path Lb by the regulating member 58, and enters the first paper feed path L1 via the second junction P2. Here, the sheet of paper T is turned upside down from the position of one-side printing.

Furthermore, the pair of resist rollers 80 performs the abovementioned compensation or the abovementioned adjustment on the sheet of paper T, which is then introduced into the secondary image transfer nip N2 via the first paper feed path L1. Since an unprinted surface of the sheet of paper T faces the intermediate image transfer belt 7 as a result of passing through the reverse paper feed path Lb, a toner image is transferred to the unprinted surface and duplex printing is realized on the sheet of paper T.

Figure 2:
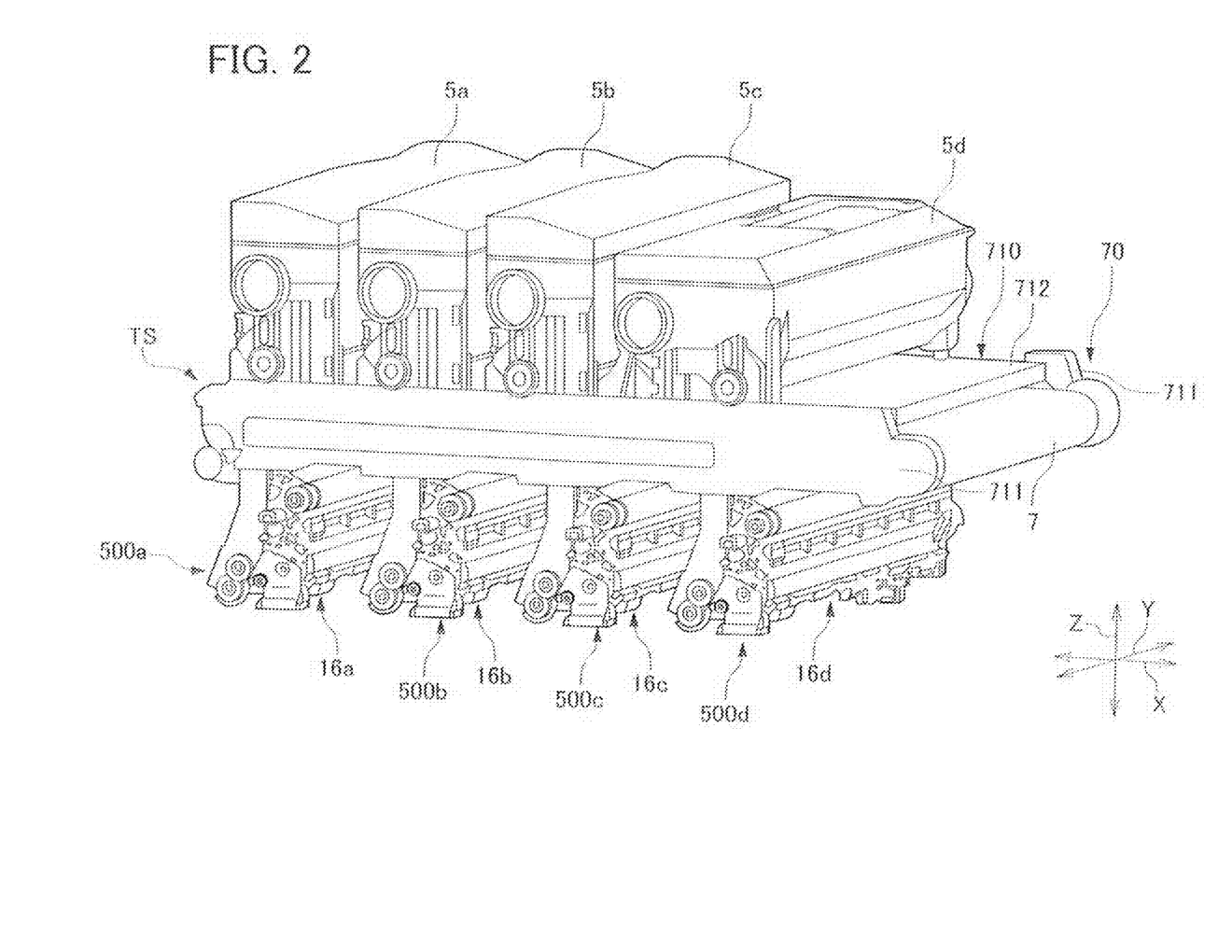
FIG. 2 is an external perspective view showing a toner feeding device TS viewed from a right front side to a left rear side of an apparatus main body M.

Next, the toner feeding device TS in the printer 1 of the first embodiment will be described in detail with reference to FIG. 2. FIG. 2 is an external perspective view showing a toner feeding device TS viewed from a right front side to a left rear side of the apparatus main body M. An overview, a description of the specific structure of components, and a description of operations are given in this order for the toner feeding device TS.

First, the overview of the toner feeding device TS is given.

As shown in FIG. 2, the toner feeding device TS includes: toner cartridges 5a, 5b, 5c and 5d as toner housing parts; an intermediate image transfer unit 70 that is connected to the drive mechanism 100 via a connecting member (not illustrated); developing units 16a, 16b, 16c and 16d; and the toner delivery devices 500a, 500b, 500c and 500d.

The intermediate image transfer unit 70 includes the intermediate image transfer belt 7, the driven roller 35 (see FIG. 1), the opposing roller 18 (see FIG. 1), the tension roller 36 (see FIG. 1), and a housing 710. The housing 710 includes a pair of side plates 711 and a top plate 712 on which the toner cartridges 5a, 5b, 5c and 5d are placed. The pair of side plates 711 covers both side parts in a width direction (direction Y) of the intermediate image transfer belt 7 and rotatably supports the driven roller 35, the opposing roller 18 and the tension roller 36. The intermediate image transfer unit 70 is disposed between the toner cartridges 5a, 5b, 5c and 5d disposed in parallel to each other in the horizontal direction (X direction) and the developing units 16a, 16b, 16c and 16d disposed in parallel to each other in the horizontal direction (X direction) of the apparatus main body M in the vertical direction (Z direction).

Drive Mechanism

Figure 3:
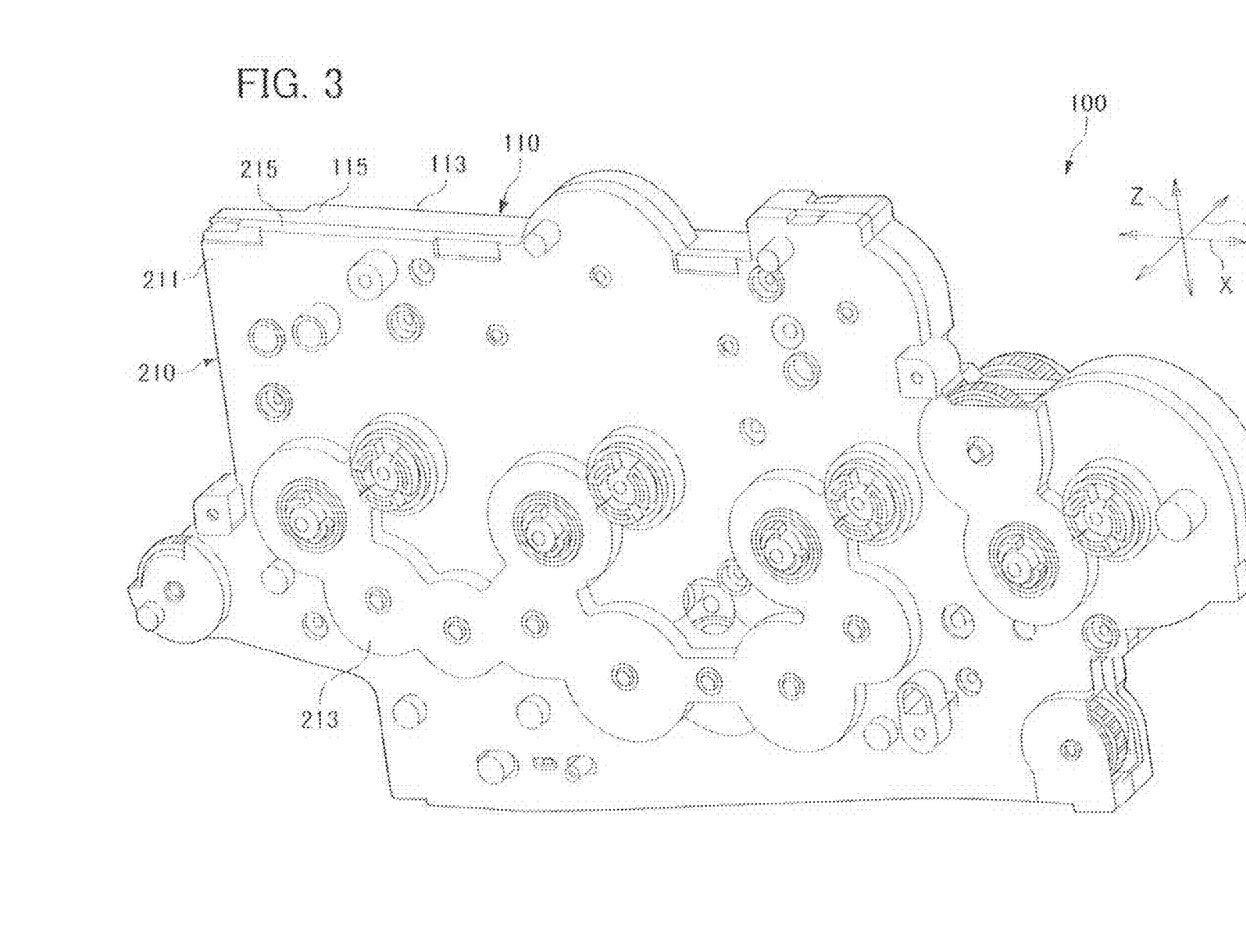
FIG. 3 is an external perspective view showing a drive mechanism 100 attached to the toner feeding device TS.
Figure 4:
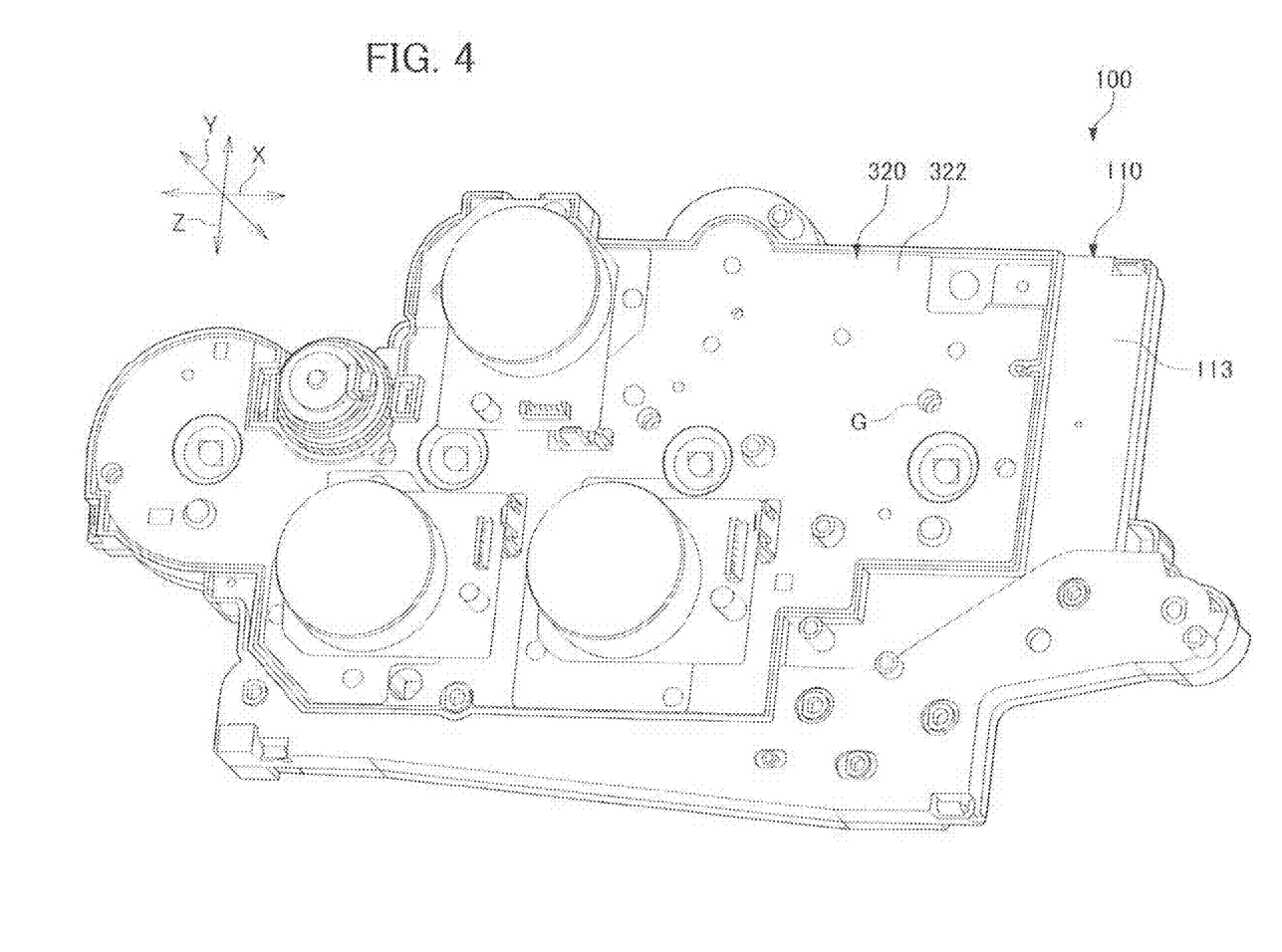
FIG. 4 is an external perspective view showing the drive mechanism 100 shown in FIG. 3, viewed from a different direction.
Figure 5:
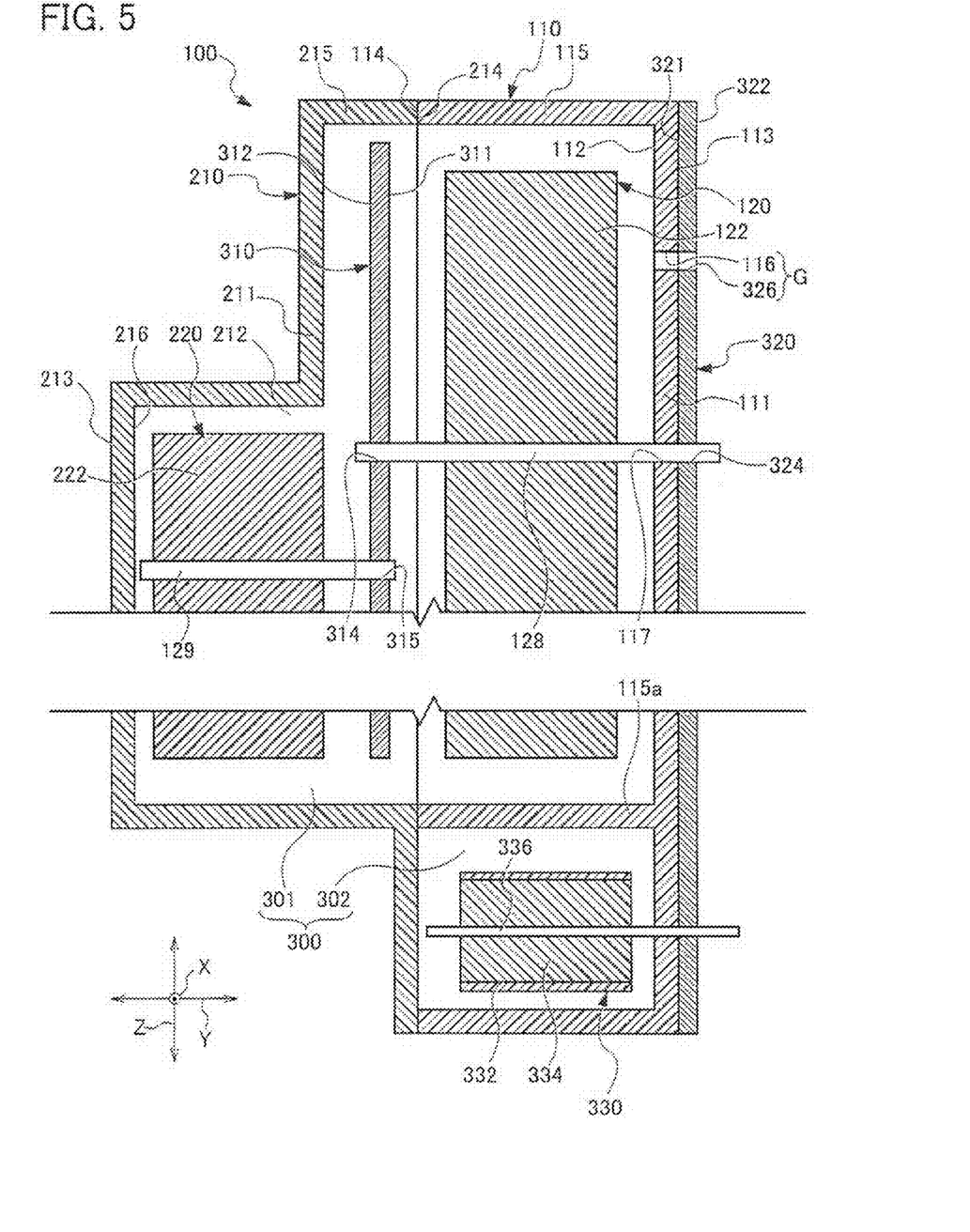
FIG. 5 is a partial enlarged view showing the drive mechanism 100 shown in FIG. 3.
Figure 6:
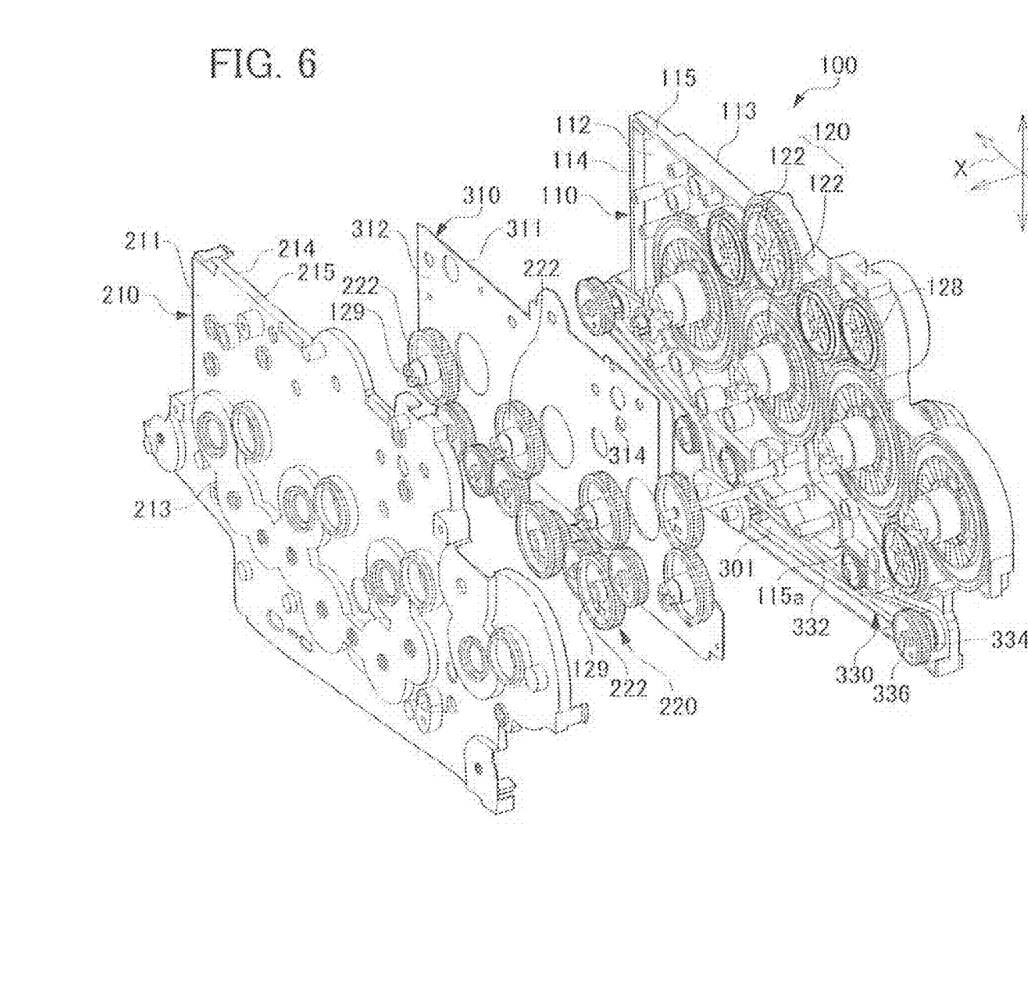
FIG. 6 is an exploded external perspective view showing the drive mechanism 100 shown in FIG. 3.
Figure 7:
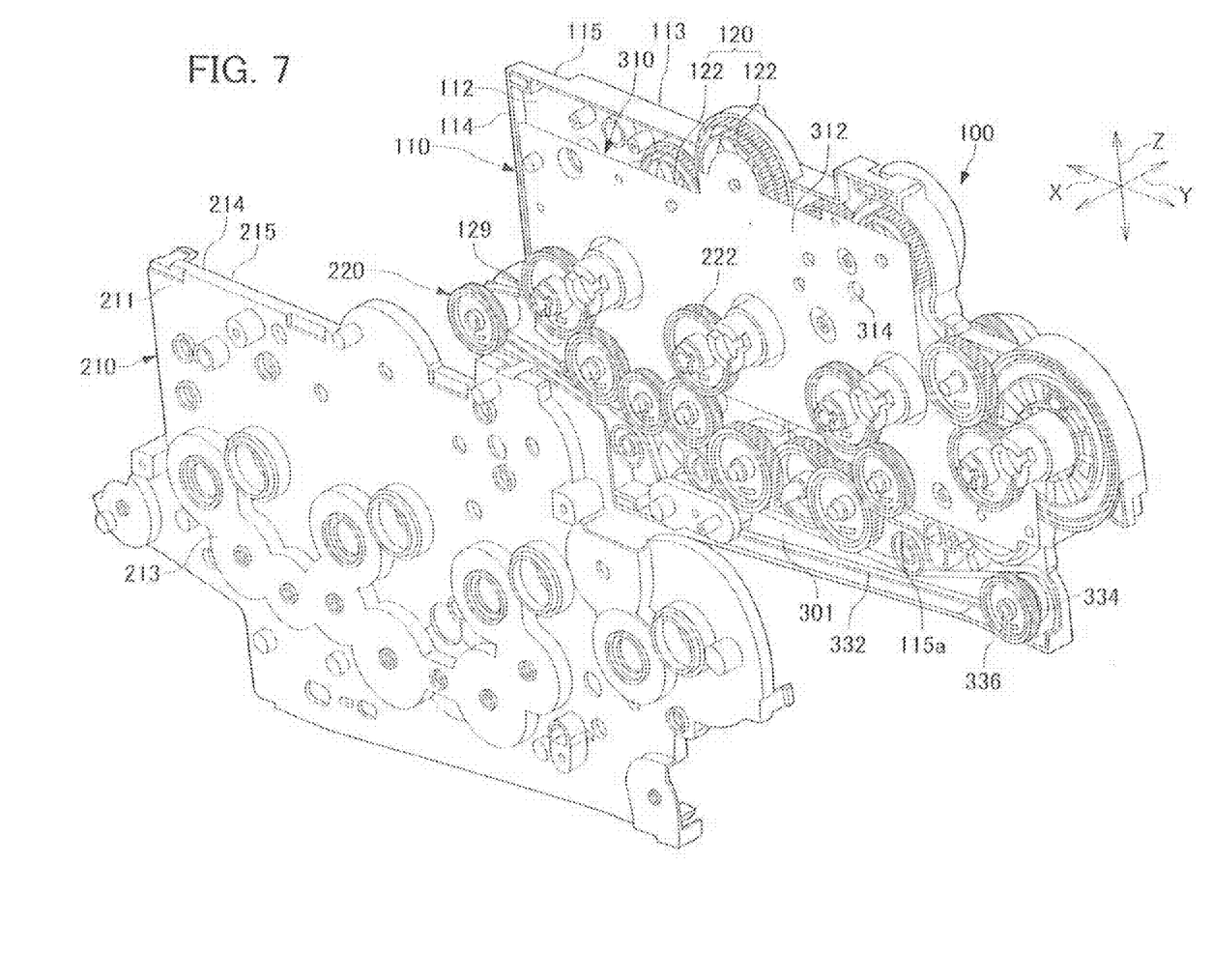
FIG. 7 is an exploded perspective view showing the drive mechanism 100 shown in FIG. 3, which is partially assembled.

Next, the drive mechanism 100 in the printer 1 of the first embodiment will be described in detail with reference to FIGS. 3 to 7. FIG. 3 is an external perspective view showing the drive mechanism 100, which is attached to the toner feeding device TS. FIG. 4 is an external perspective view showing the drive mechanism 100 shown in FIG. 3, viewed from a different direction. FIG. 5 is a partial enlarged view showing the drive mechanism 100 shown in FIG. 3. FIG. 6 is an exploded external perspective view showing the drive mechanism 100 shown in FIG. 3. FIG. 7 is an exploded perspective view showing the drive mechanism 100 shown in FIG. 3, which is partially assembled.

As shown in FIG. 3, the drive mechanism 100 is disposed on a rear side of the intermediate image transfer unit 70 in the depth direction (Y direction). The drive mechanism 100 drives the intermediate image transfer unit 70 via the connecting member (not illustrated).

As shown in FIGS. 3 to 7, the drive mechanism 100 includes: a first resin cover 110; a second resin cover 210; a housing part 300; a first sheet metal member 310; a plurality of first rotation transmission wheels 122 composing a first rotation transmission wheel group 120; a plurality of second rotation transmission wheels 222 composing a second rotation transmission wheel group 220; a second sheet metal member 320; a plurality of first positioning parts 314 as at least one positioning part; a plurality of first pin members 128 as a plurality of pin members; a belt revolution transmission wheel group 330; and a plurality of belt supporting pin members 336.

First Resin Cover, Second Resin Cover, Housing Part

As shown in FIGS. 5 to 7, the first resin cover 110 is formed in a box shape that is longer in the X direction and shorter in the Z direction. The first resin cover 110 has a first concave part 112 that is open toward one direction. The first resin cover 110 is a member made of resin.

The first resin cover 110 has: a base part 111; a rib part (outer periphery) 115 that extends from an outer periphery of the base part 111 toward the second resin cover 210 in the Y direction; the first concave part 112 formed of the base part 111 and the rib part 115; and a partitioning rib part 115a that extends in the X direction so as to partition the first concave part 112.

The first concave part 112 is provided on a side of a lateral face 114, opening into the second resin cover 210 in the Y direction of the first resin cover 110. The first concave part 112 is sized to house the plurality of first rotation transmission wheels 122.

The second resin cover 210 is formed in a box shape that is longer in the X direction and shorter in the Z direction. The second resin cover 210 has a second concave part 212 that is open toward one direction. The second resin cover 210 is a member made of resin. The second resin cover 210 is disposed such that an outer periphery (a lateral face 214) of the second concave part 212 faces and contacts an outer periphery (the lateral face 114) of the first concave part 112.

The second resin cover 210 has: a base part 211; a rib part 215 that extends from an outer periphery of the base part 211 toward the first resin cover 110 in the direction Y; and a second concave part 212 formed of the base part 211 and the rib part 215. The second concave part 212 is provided on a lateral face 214, opening into a side of the first resin cover 110 in the Y direction of the second resin cover 210. The second concave part 212 is sized to house the plurality of second rotation transmission wheels 222.

As shown in FIG. 5, the housing part 300 is composed of the first concave part 112 and the second concave part 212. The housing part 300 is composed of the first concave part 112 and the second concave part 212 that are arranged to be opposite to each other such that the lateral face 114 of the first resin cover 110 comes in contact with the lateral face 214 of the second resin cover 210.

The housing part 300 has a first housing part 301 and a second housing part 302. The housing part 300 is partitioned into the first housing part 301 and the second housing part 302 by the partitioning rib part 115a that extends from a bottom face of the first concave part 112 of the first resin cover 110 in the Y direction.

The first housing part 301 houses the first sheet metal member 310, the plurality of first rotation transmission wheels 122 (the first rotation transmission wheel group), and the plurality of second rotation transmission wheels 222 (the second rotation transmission wheel group), which will be described later. The second housing part 302 houses the plurality of belt revolution transmission wheels 334 (the belt revolution transmission wheel group), which will be described later.

First Sheet Metal Member and Second Sheet Metal Member

The first sheet metal member 310 is shape like a plate that is longer in the X direction and shorter in the Z direction. The first sheet metal member 310 is sized to be housed in the first concave part 112. The first sheet metal member 310 is a metallic plate-like member. The first sheet metal member 310 is disposed in the housing part 300 such that a lateral face 311 thereof is directed to the first resin cover 110 and a lateral face 312 thereof is directed to the second resin cover 210.

The plurality of through-hole shaped first positioning parts 314, through which the plurality of first pin members 128 penetrates, is formed in the first sheet metal member 310. The plurality of first positioning parts 314 is formed in the first sheet metal member 310 like a through hole. The first positioning parts 314 are penetrated through by the plurality of first pin members 128 and rotatably support the plurality of first rotation transmission wheels 122.

The second sheet metal member 320 is layered on the lateral face 113 of the first resin cover 110. The second sheet metal member 320 is not housed (not disposed) in the housing part 300, but rather is disposed on an outer side of the drive mechanism 100.

The second sheet metal member 320 is disposed on the lateral face 113 of the first resin cover 110 on a side opposite to the second resin cover 210, such that the lateral face 321 of the second sheet metal member 320 faces the lateral face 113 of the first resin cover 110. The second sheet metal member 320 is disposed opposite to the first sheet metal member 310, interposing the first resin cover 110 therebetween. The first sheet metal member 310 is a metallic plate-like member.

The plurality of through-hole shaped second positioning parts 324 is formed in the second sheet metal member 320. The plurality of first pin members 128 mates with the plurality of second positioning parts 324, respectively. The plurality of first pin members 128 is installed upright on the second sheet metal member 320, on a side directed to the first sheet metal member 310. Each of the plurality of first pin members 128 is inserted into each of the plurality of first positioning parts 314 via the first resin cover 110 so as to be positioned.

Each of the plurality of first pin members 128 is inserted into a second positioning part 324 on the second sheet metal member 320, a through hole 117 penetrating a bottom portion of the first concave part 112 of the first resin cover 110, a rotational center of a first rotation transmission wheel 122, and each of the plurality of first positioning parts 314. In this manner, each of the plurality of first pin members 128 is positioned.

First Rotation Transmission Wheel Group and First Rotation Transmission Wheel

The first rotation transmission wheel group 120 is composed of the plurality of first rotation transmission wheels 122. The plurality of first rotation transmission wheels 122 (the first rotation transmission wheel group 120) is housed in the first housing part 301 of the housing part 300. The plurality of first rotation transmission wheels 122 includes gears or the like.

The plurality of first rotation transmission wheels 122 is disposed so as to engage with each other, between the first concave part 112 of the first resin cover 110 and the lateral face 311 of the first sheet metal member 210 directed to a side of the first resin cover 110. Each of the plurality of first pin members 128 is inserted into each of the at least one first rotation transmission wheel 122. Each of the plurality of first rotation transmission wheels 122 is rotatably supported by each of the plurality of first pin members 128.

Second Rotation Transmission Wheel Group and Second Rotation Transmission Wheel

The second rotation transmission wheel group 220 is composed of the plurality of second rotation transmission wheels 222. The plurality of second rotation transmission wheels 222 (the second rotation transmission wheel group 220) is housed in the second housing part 302 of the housing part 300. The plurality of second rotation transmission wheels 222 includes gears or the like.

The plurality of second rotation transmission wheels 222 is disposed so as to engage with each other, between the second concave part 212 of the second resin cover 210 and the lateral face 312 of the second sheet metal member 310 directed to a side of the second resin cover 210. Each of the plurality of second pin members 129 is inserted into each of the at lease one second rotation transmission wheel 222. Each of the plurality of second rotation transmission wheels 222 is rotatably supported by each of the plurality of second pin members 129.

The plurality of second pin members 129 is inserted upright into third positioning parts 315 shaped like a through hole formed in the first sheet metal member 310. Each of the plurality of second pin members 129 is inserted into each of the at least one second rotation transmission wheel 222. Each of the plurality of second pin members 129 rotatably supports the at least one second rotation transmission wheel 222.

Belt Revolution Transmission Wheel Group

The drive mechanism 100 is provided with the belt revolution transmission wheel group 330 and the plurality of belt supporting pin members 336. The belt revolution transmission wheel group 330 is housed in the second housing part 302 of the housing part 300. The belt revolution transmission wheel group 330 has a continuous loop belt 332 and the plurality of belt revolution transmission wheels 334 on which the continuous loop belt 332 is wound.

The plurality of belt supporting pin members 336 is inserted into the plurality of belt revolution transmission wheels 334 and rotatably supports the plurality of belt revolution transmission wheels 334. Each of the plurality of belt supporting pin members 336 is installed upright on the lateral face 321 of the second sheet metal member 320, on a side directed to the first sheet metal member 310. The plurality of belt supporting pin members 336 is inserted into the plurality of belt revolution transmission wheels 334 and rotatably supports the plurality of belt revolution transmission wheels 334, respectively.

Grease Injection Hole

A grease injection hole G opens into the first housing part 301 via an injection bore 326 in the second sheet metal member 320 and an injection bore 116 in the first resin cover 110. The grease injection hole G is an opening that is formed to cause the outside of the drive mechanism 100 and the first housing part 301 to communicate with each other. A user injects grease, which is necessary for the first rotation transmission wheels 122 composing the first rotation transmission wheel group 120 and the like, from outside the drive mechanism 100 to inside the first housing part 301 through the grease injection hole G.

Assembly of Drive Mechanism

As shown in FIGS. 5 to 7, the drive mechanism 100 is assembled as follows.

First, an operator installs the plurality of first pin members 128 upright in the second positioning parts 324, such that the plurality of first pin members 128 extends toward the lateral face 321 of the second sheet metal member 320. Since each of the plurality of first pin members 128 is installed upright on the second sheet metal member 320, it is possible to maintain the accuracy of the interaxial distance between adjacent first pin members 128.

Next, the operator inserts the plurality of first pin members 128 respectively into a plurality of through holes 117 formed in the first resin cover 110. As a result, the lateral face 321 of the second sheet metal member 320 closely contacts the lateral face 114 of the first resin coyer 110. In addition, the plurality of first pin members 128 is disposed inside the first concave part 112 of the first resin cover 110. Since the plurality of first pin members 128 is installed upright on the second sheet metal member 320 as described above, the interaxial distance between adjacent first pin members 128 is still maintained with high accuracy.

Next, as shown in FIG. 5, the operator inserts the plurality of first pin members 128 rotatably into the plurality of first rotation transmission wheels 122, respectively. A first rotation transmission wheel 122 is fitted onto a first pin member 128 while the first rotation transmission wheel 122 is sliding in the Y direction, in which the rotational axis thereof extends. Here, the operator makes adjacent first rotation transmission wheels 122 slide in the Y direction while slightly rotating them in the rotational direction thereof, such that the adjacent first rotation transmission wheels 122 engage with each other.

Next, as shown in FIG. 7, the operator disposes the first sheet metal member 310 to be layered on the first resin cover 110. Here, the operator inserts a head part of the first pin member 128, which is exposed from the first rotation transmission wheel 122, into a first positioning part 314, which is a through hole in the first sheet metal member 310. During the steps described above, the accuracy of the interaxial distance between the adjacent first pin members 128 is maintained, while the accuracy of the interaxial distance between the first positioning parts 314 on the first sheet metal member 310 is also maintained. Accordingly, it is possible for the operator to insert the head part of the first pin member 128 into the first positioning part 314, which is a through hole in the first sheet metal member 310.

In the following description of assembly steps (including post-assembly), both ends of the plurality of first pin members 128 are inserted into the first positioning parts 314 on the first sheet metal member 310 and the second positioning parts 324 on the second sheet metal member 320. Accordingly, the interaxial distance between the adjacent first pin members 128 is maintained with high accuracy.

Next, as shown in FIG. 7, the operator inserts the plurality of second pin members 129 into the through-hole shaped third positioning parts 315 formed in the first sheet metal member 310. Since the plurality of second pin members 129 is installed upright on the first sheet metal member 310, the interaxial distance between adjacent second pin members 129 is maintained with high accuracy.

The operator places the second rotation transmission wheels 222 on the second pin members 129 that have been installed upright. Since the interaxial distance between the adjacent second pin members 129 is maintained with high accuracy, it is possible to cause the plurality of second rotation transmission wheels 222 to engage with each other with high accuracy. Since the plurality of second pin members 129 is inserted into the plurality of second rotation transmission wheels 222, respectively, the plurality of second pin members 129 rotatably supports the plurality of second rotation transmission wheels 222.

Next, as shown in FIGS. 3 and 5, the operator attaches the second resin cover 210 to the first resin cover 110. As a result, the first concave part 112 and the second concave part 212 form into the housing part 300 (the first housing part 301 and the second housing part 302). In addition, the first housing part 301 houses the first sheet metal member 310, the first rotation transmission wheel group 120, and the second rotation transmission wheel group 220. The second housing part 302 houses the belt revolution transmission wheel group 330.

Grease Injection

A user injects grease, which is necessary for the first rotation transmission wheels 122 composing the first rotation transmission wheel group 120 and the like, from outside the drive mechanism 100 to inside the first housing part 301 through the grease injection hole G.

The present embodiment provides the following effects, for example.

Since both ends of the plurality of first pin members 128 are inserted into the first positioning parts 314 on the first sheet metal member 310 and the second positioning parts 324 on the second sheet metal member 320 according to the present embodiment, the interaxial distance between the adjacent first pin members 128 is maintained with high accuracy. As a result, noise due to engagement of gears hardly occurs upon rotation of the first rotation transmission wheels 122 and the second rotation transmission wheels 222.

In the present embodiment, the first rotation transmission wheel group 120 and the second rotation transmission wheel group 220 are housed in the housing part 300 separately from the belt revolution transmission wheel group 330, by means of the partitioning rib part 115a. Therefore, according to the present embodiment, the grease and the like injected to the first rotation transmission wheels 122 of the first rotation transmission wheel group 120 does not easily adhere to the belt revolution transmission wheel group 330.

In the present embodiment, since the first rotation transmission wheel group 120 and the second rotation transmission wheel group 220 are housed in the first housing part 301, the noise due to engagement of gears upon rotation of the first rotation transmission wheels 122 and the second rotation transmission wheels 222 is hardly transmitted from inside to outside the first housing part 301.

Although a preferred embodiment of the present invention has been described above, the present invention is not limited thereto and can be carried out using various modes.

The image forming apparatus of the present invention is not particularly limited, and may include a copy machine, a printer, a facsimile machine, or a multi-functional printer having functions thereof.

What is claimed is:

1. A drive mechanism for an image forming apparatus comprising:
    a first resin cover having a first concave part opening toward a first face;
    a second resin cover having a second concave part opening toward the first resin cover, and disposed such that a periphery of the second concave part is aligned to come into contact with a periphery of the first concave part;
    a housing part including the first concave part and the second concave part;
    a first sheet metal member disposed inside the housing part;
    a first rotation transmission wheel group having at least one first rotation transmission wheel, housed by the housing part and disposed on the first sheet metal member on a side directed to the first resin cover;
    a second rotation transmission wheel group housed by the housing part and disposed on the first sheet metal member on a side directed to the second resin cover;
    a second sheet metal member that is disposed on the first resin cover on a side opposite to the second resin cover and disposed opposite to the first sheet metal member interposing the first resin cover therebetween;
    at least one positioning part that is formed like a through hole in the first sheet metal member rotatably supporting the at least one first rotation transmission wheel; and
    at least one pin member that is installed on the second sheet metal member on a side directed to the first sheet metal member, each pin member being inserted into each positioning part via the first resin cover such that each pin member is positioned.

2. The drive mechanism according to claim 1, further comprising:
    a belt revolution transmission wheel group housed by the housing part, including a continuous loop belt and a plurality of belt revolution transmission wheels on which the continuous loop belt is wound; and
    a plurality of belt supporting pin members that is installed on the second sheet metal member on a side directed to the first sheet metal member and inserted into the positioning part via the first resin cover such that the plurality of belt supporting pin members are positioned, wherein the plurality of belt supporting pin members is respectively inserted into the plurality of belt revolution transmission wheels, and rotatably supports the plurality of belt revolution transmission wheels, and wherein the housing part includes a first housing part that houses the first sheet metal member, the first rotation transmission wheel group and the second rotation transmission wheel group, and a second housing part that houses the belt revolution transmission wheel group.

3. The drive mechanism according to claim 2, further comprising a grease injection hole that opens into the first housing part via the second sheet metal member and the first resin cover.

4. An image forming apparatus comprising:
- at least one image supporting unit on a surface of which an electrostatic latent image is formed;
- a developing unit configured to develop a toner image on the electrostatic latent image formed on the at least one image supporting unit;
- an image transfer part configured to directly or indirectly transfer the toner image formed on the image supporting unit to an object;
- a fixing part configured to fix the toner image transferred to the object; and
- the drive mechanism according to claim 1, for driving at least one of the image supporting unit, the developing unit, the image transfer part or the fixing part.

5. An image forming apparatus comprising:
- at least one image supporting unit on a surface of which an electrostatic latent image is formed;
- a developing unit configured to develop a toner image on the electrostatic latent image formed on the at least one image supporting unit;
- an image transfer part configured to directly or indirectly transfer the toner image formed on the image supporting unit to an object; and
- a fixing part configured to fix the toner image transferred to the object; and
- the drive mechanism according to claim 2, for driving at least one of the image supporting unit, the developing unit, the image transfer part or the fixing part.

6. An image forming apparatus comprising:
- at least one image supporting unit on a surface of which an electrostatic latent image is formed;
- a developing unit configured to develop a toner image on the electrostatic latent image formed on the at least one image supporting unit;
- an image transfer part configured to directly or indirectly transfer the toner image formed on the image supporting unit to an object; and
- a fixing part configured to fix the toner image transferred to the object; and
- the drive mechanism according to claim 3, for driving at least one of the image supporting unit, the developing unit, the image transfer part or the fixing part.

* * * * *